(12) United States Patent
Goto et al.

(10) Patent No.: US 7,539,586 B2
(45) Date of Patent: May 26, 2009

(54) CORRECTION METHOD AND MEASURING INSTRUMENT

(75) Inventors: Tomonori Goto, Sapporo (JP); Soichi Kadowaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/797,744

(22) Filed: May 7, 2007

(65) Prior Publication Data

US 2007/0260411 A1    Nov. 8, 2007

(30) Foreign Application Priority Data

May 8, 2006    (JP)    ............................. 2006-129439

(51) Int. Cl.
  *G01N 37/00*  (2006.01)
  *G01D 18/00*  (2006.01)
(52) U.S. Cl. ............................. 702/84; 702/95; 73/105; 33/503; 318/560; 318/638
(58) Field of Classification Search ................... 702/85, 702/94, 95; 318/560, 632, 638; 33/503, 33/551; 73/105
See application file for complete search history.

(56) References Cited

U.S. PATENT DOCUMENTS

| | | | |
|---|---|---|---|
| 4,377,911 A * | 3/1983 | Iida et al. | ........................ 33/561 |
| 4,945,501 A | 7/1990 | Bell et al. | |
| 5,150,314 A | 9/1992 | Garratt et al. | |
| 6,453,730 B2 * | 9/2002 | Takemura | ..................... 73/105 |
| 2001/0029778 A1 | 10/2001 | Takemura | |

FOREIGN PATENT DOCUMENTS

| | | |
|---|---|---|
| DE | 101 15 288 A1 | 10/2001 |
| EP | 1 821 063 A1 | 8/2007 |
| JP | A 3-115902 | 5/1991 |
| JP | 2727067 B2 | 3/1998 |
| JP | 3215325 B2 | 10/2001 |
| JP | A 2003-500675 | 1/2003 |
| WO | WO 00/73731 A1 | 12/2000 |

OTHER PUBLICATIONS

Chang-Ock Lee;,"An Algorithm for Stylus Instruments to Measure Aspheric Sufaces"; *Measurement Science & Technology*; vol. 16; Apr. 19, 2005; pp. 1215-1222.

* cited by examiner

*Primary Examiner*—Edward Raymond
*Assistant Examiner*—Elias Desta
(74) *Attorney, Agent, or Firm*—Oliff & Berridge, PLC

(57) ABSTRACT

A measuring instrument comprising a stylus displaced following a work, the instrument further comprises a corrector for correcting a displacement in the translation axis direction value according to a height detection axis direction value of the stylus position in a plane specified by the height detection axis and the translation axis, the corrector comprising a calibration measuring device that obtains the calibration measurement data including the displacement information of the translation axis direction value corresponding to the height detection axis direction value of the stylus by moving the stylus; a correction parameter setting device that determines a correction parameter best suited for correcting the measurement error due to the vertical movement error of the stylus based on the displacement information of the stylus; and a measurement data correcting device that corrects a measurement data by using the correction parameter.

11 Claims, 5 Drawing Sheets

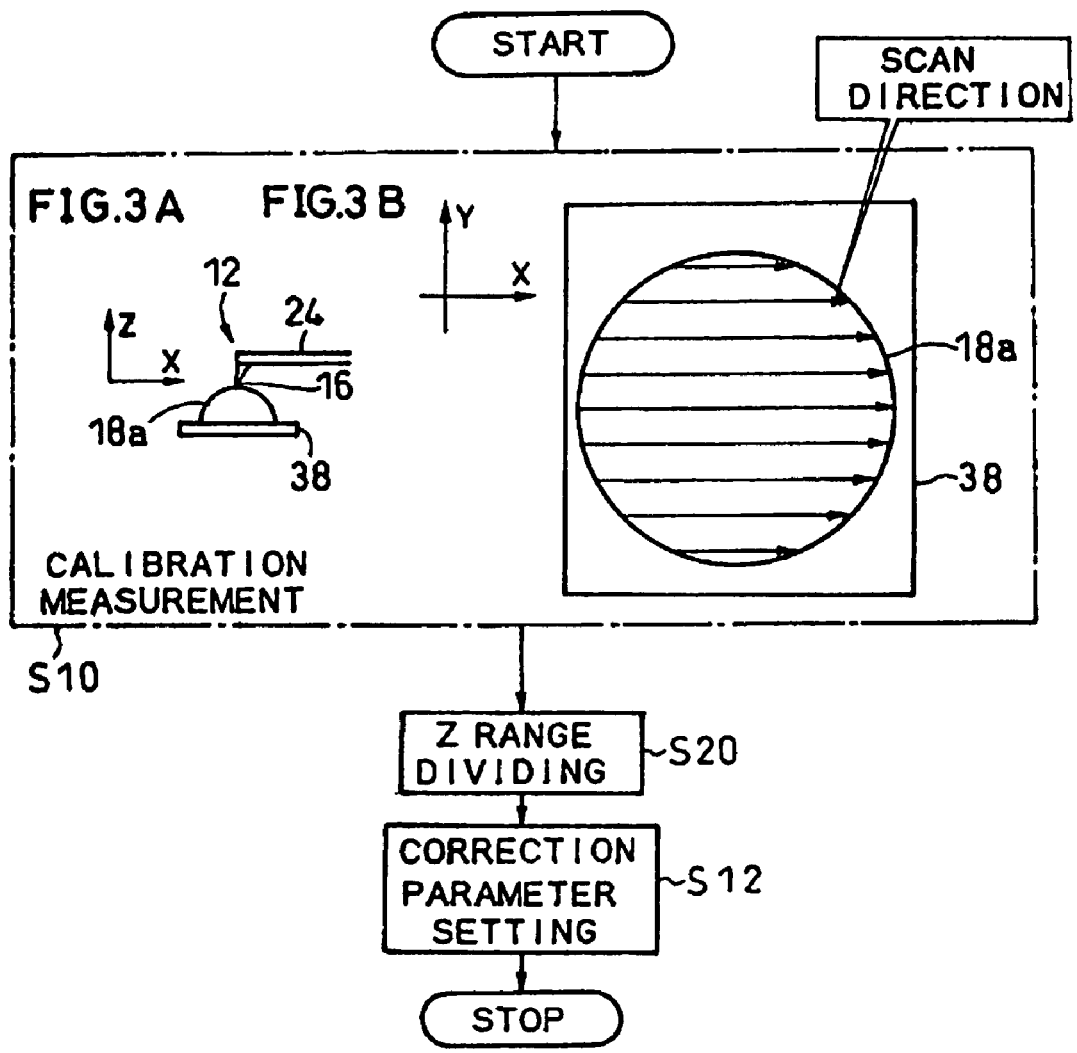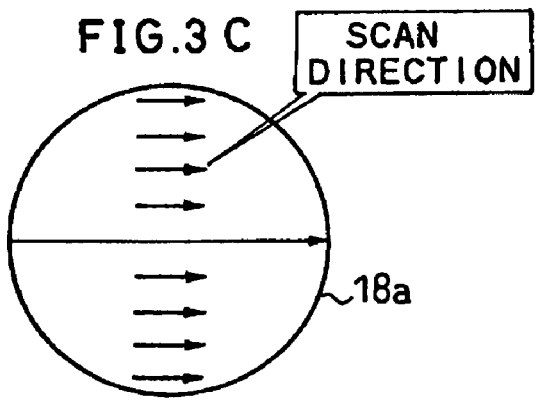

CORRECTION METHOD AND MEASURING INSTRUMENT

RELATED APPLICATIONS

This application claims priority to the Japanese Patent Application 2006-129439 dated on May 8, 2006 and is hereby incorporated by reference.

BACKGROUND OF THE INVENTION

1. Field of the Invention

The present invention relates to a correction method and a measuring instrument and, more particularly, to an improvement of a correction mechanism for correcting a measurement error due to the motion of a stylus.

2. Prior Art

Conventionally, a precision measuring instrument such as a form measuring instrument has been used to measure the form of a work. The precision measuring instrument includes a stylus and a pickup. When tracing is performed on a work in the X-axis direction by using the tip of a stylus, the stylus moves up and down following the height of work. The pickup detects the up-and-down movement of the stylus, and obtains coordinate value information of a point on the work. From the obtained coordinate value information on the work, the form is then determined.

For precision measuring instruments, highly accurate measurements are demanded as compared to general measuring instruments. However, a pivot-type stylus may cause an error in the measurement result because a stylus arm performs circular motion around a supporting point. Therefore, in precise measurements, it is very important has properly reduce measurement errors due to the circular motion.

To meet such a demand, an attempt has been made to reduce the influence of measurement errors due to the circular motion of pivot-type styluses by correcting the data measured by the pivot-type stylus using a correction algorithm described, for example, in Japanese Patent No. 2727067, Japanese Patent No. 3215325, Japanese Unexamined Patent Application Publication (Translation of PCT Application) No. 2003-500675, Japanese Unexamined Patent Application Publication No. 03-115902, and U.S. Pat. No. 5,150,314.

However, even in the above-described conventional system, regarding the correction accuracy of data measured by a stylus, further improvement has been demanded. Also, conventionally, a proper technique capable of meeting this demand has not existed.

SUMMARY OF THE INVENTION

The present invention has been made to solve the problems with the conventional art, and accordingly an object thereof is to provide a correction method and a measuring instrument capable of correcting the data measured by a stylus with higher accuracy.

The inventors have carried out continual studies on the correction of data measured by a stylus, and resultantly found the fact that a very high accurate correction result can be obtained by correcting the measurement error due to a vertical movement error in the YZ plane of the stylus as compared with the conventional system although the inventors have conventionally paid attention to only the measurement error due to the circular motion of a pivot-type stylus in the XZ plane, and finally completed the present invention.

In order to achieve the object described above, a correction method according to the present invention corrects a measurement error included in data obtained by tracing the surface to be measured of a work in the measurement axis direction by using the tip of a stylus, the correction method comprises a calibration measurement step, and a correction parameter setting step.

The measurement error is a measurement error due to a vertical movement error of the stylus displaced following the surface to be measured of the work. The vertical movement error is a displacement in the translation axis direction value according to a height detection axis direction value of the tip position in a vertical movement error correction plane specified by the height detection axis and the translation axis.

The calibration measurement step obtains calibration measurement data including the displacement information of a translation axis direction value corresponding to the height detection axis direction value of the stylus by moving the stylus.

The correction parameter setting step determines a vertical movement error correction parameter value best suited for correcting the measurement error due to the vertical movement error of the stylus based on the displacement information of the stylus included in the calibration measurement data obtained in the calibration measurement step.

In the correction method according to the present invention, it is preferred that in the calibration measurement step, a reference sphere is a complete sphere with its surface finished precisely is traced in the measurement axis direction at a designated translation axis direction value by the stylus, whereby the stylus is moved, and also, cross-sectional contour information including at least the top of the sphere is obtained in a plurality of different translation axis direction values on the reference sphere, whereby the calibration measurement data is obtained. It is preferred that in the correction parameter setting step, the value of the vertical movement error correction parameter is determined by comparing the calibration measurement data with the reference information about the reference sphere.

In the correction method according to the present invention, it is preferred that in the correction parameter setting step, actual moving locus information actually drawn on the vertical movement error correction plane by the stylus based on the information of the top of the sphere included in the calibration measurement data is determined, and also, ideal moving locus information on the vertical movement error correction plane of the stylus is determined based on the reference contour information about the reference sphere. It is preferred that in the correction parameter setting step, by comparing the actual moving locus information of the stylus with the ideal moving locus information thereof, the displacement information of the translation axis direction value corresponding to the height detection axis direction value of the stylus is estimated, and the value of the vertical movement error correction parameter best suited for correcting the estimated displacement information is determined.

In the correction method according to the present invention, it is preferred that the measurement error is a measurement error due to the vertical movement error of the pivot-type stylus performing circular motion on a motion error correction plane specified by the measurement axis and the height detection axis.

In the correction method according to the present invention, it is preferred that the measurement error is the vertical movement error of a linear stylus performing linear motion on the motion error correction plane specified by the measurement axis and the height detection axis.

In the correction method according to the present invention, it is preferred that the measurement error is a measurement error due to the motion of the stylus in the motion error correction plane specified by the measurement axis and the height detection axis. It is preferred that in the correction parameter setting step, the value of a motion error correction parameter best suited for correcting the measurement error due to the motion of the stylus in the motion error correction plane is further determined.

In the correction method according to the present invention, it is preferred that a measurement range in the height detection axis direction is divided in advance into a predetermined number of regions. It is preferred that in the correction parameter setting step, the optimal value of the vertical movement error correction parameter or the optimal value of the motion error correction parameter is determined in each of the divided regions.

In the correction method according to the present invention, it is preferred that in the correction parameter setting step, the optimal value of the vertical movement error correction parameter or the optimal value of the motion error correction parameter is determined in each of the divided regions at the same time by using the nonlinear least-squares method.

In the correction method according to the present invention, it is preferred that the correction method comprises a measurement data correcting step of correcting the measurement data, which is obtained by tracing the work to be measured by using the stylus, by using the value of the vertical movement error correction parameter or the value of the motion error correction parameter. It is preferred that in the measurement data correcting step, the value of the vertical movement error correction parameter or the value of the motion error correction parameter best suited for correcting the measurement data is selected from the values of the vertical movement error correction parameter or the values of the motion error correction parameter, which are determined in the correction parameter setting step, based on the height detection axis direction value that the measurement data has.

In order to achieve the object described above, a measuring instrument according to the present invention comprises a stylus displaced following the surface to be measured of a work, and a pickup for outputting at least a height detection axis direction value of the stylus, the measuring instrument further comprises a corrector for correcting a measurement error included in the data obtained by tracing the surface to be measured of the work in the measurement axis direction by a tip of the stylus.

The measurement error is a measurement error due to a vertical movement error of the stylus. The vertical movement error is a displacement in the translation axis direction value corresponding to the height detection axis direction value of the tip position in a vertical movement error correction plane specified by the height detection axis and the translation axis.

The corrector comprises a calibration measuring device, a correction parameter setting device, and a measurement data correcting device.

The calibration measuring device obtains the calibration measurement data including the displacement information of a translation axis direction value corresponding to the height detection axis direction value of the stylus by moving the stylus.

The correction parameter setting device determines the value of the vertical movement error correction parameter best suited for correcting the measurement error due to the vertical movement error of the stylus based on the displacement information of the stylus included in the calibration measurement data obtained by the calibration measuring device.

The measurement data correcting device corrects a measurement data, which is obtained by tracing the work to be measured by using the stylus, by using the value of the vertical movement error correction parameter determined by the correction parameter setting device.

The measurement axis direction referred here means the detection coincide with the feed direction of the pick up (tracing direction). The translation direction referred here means the direction perpendicular to the measurement axis direction and the height detection axis direction. The displacement referred here means that displacement of the tip position in the translation direction from a normal position in the ideal vertical movement (height detection axis).

According to the correction method (measuring instrument) in accordance with the present invention, the calibration measurement step (calibration measuring device) and the correction parameter setting step (correction parameter setting device) are provided. As the result, according to the present invention, the measurement error due to the vertical movement error of the stylus can be corrected. Therefore, in the present invention, the measurement data obtained by the stylus can be corrected with very high accuracy as compared with the conventional example.

Also, in the present invention, by further setting a motion error correction parameter, the measurement data obtained by the stylus can be corrected with higher accuracy.

In the present invention, by setting the optimal value of correction parameter in each of regions obtained in advance by dividing the measurement range in the height detection axis direction, the measurement data obtained by the stylus can be corrected with higher accuracy.

Herein, in the present invention, by determining all values of the correction parameter at the same time, the highly accurate correction can be made more efficiently.

BRIEF DESCRIPTION OF THE DRAWINGS

FIGS. 3A, 3B, and 3C are an explanatory view of a calibration measurement step and a correction parameter setting step in accordance with one embodiment.

DESCRIPTION OF THE PREFERRED EMBODIMENT

One preferred embodiment of the present invention will now be described with reference to the accompanying drawings.

Figure 1A:
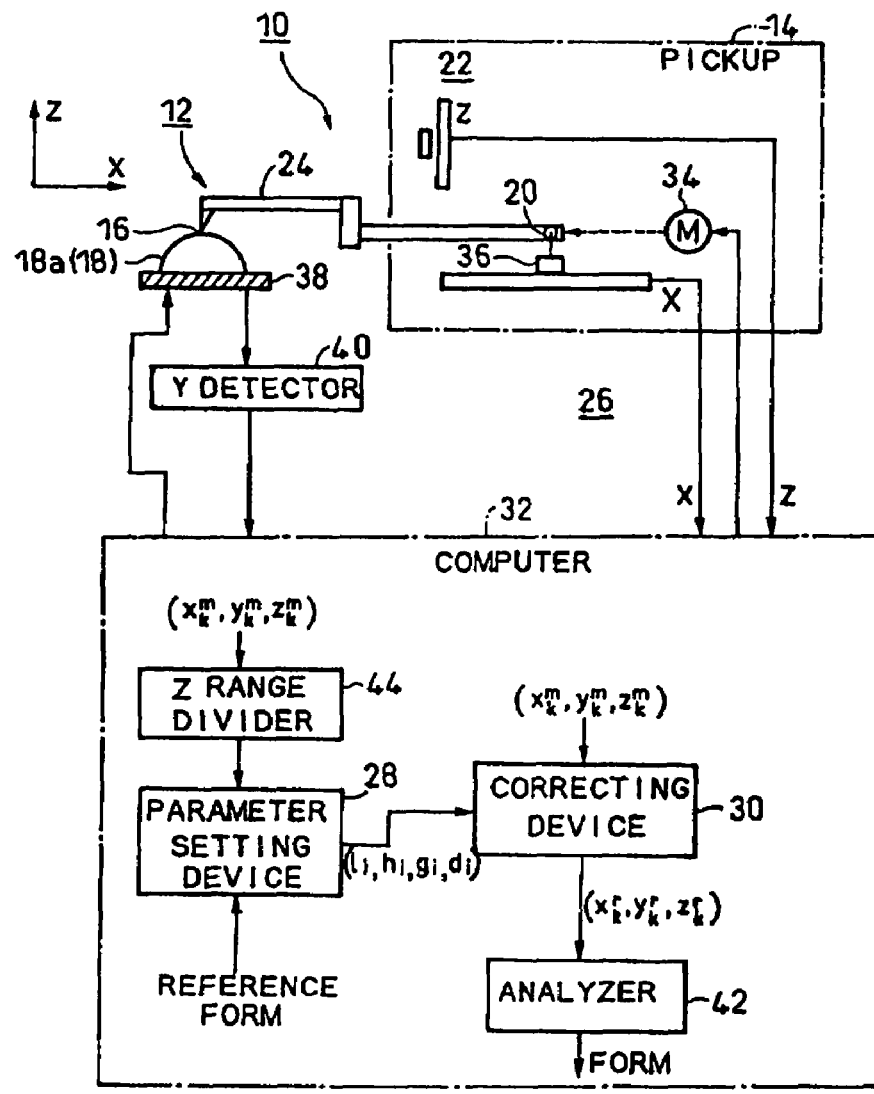
FIGS. 1A and 1B are an explanatory view of a measuring instrument for carrying out a correction method in accordance with one embodiment of the present invention.
Figure 1B:
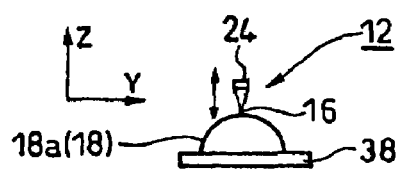

FIG. 1 shows a schematic configuration of a measuring instrument for carrying out a correction method in accordance with one embodiment of the present invention. FIG. 1A is a view of a stylus viewed from the XZ plane, and FIG. 1B is a view of a stylus viewed from the YZ plane. In this embodiment, a case is explained in which a measurement error due to a vertical movement error (vertical fall error) of a pivot-type stylus is corrected.

A form measuring instrument (measuring instrument) 10 shown in FIG. 1 includes a pivot-type stylus (stylus) 12 and a pickup 14.

When tracing is performed in the X-axis direction (measurement axis direction) on the surface to be measured of a work 18 using a tip 16, the pivot-type stylus 12 performs circular motion around a supporting point 20 in the XZ plane (motion error correction plane) following the surface to be measured of the work 18.

The pickup 14 has a Z value detector 22, and detects displacement in the Z-axis direction (height detection axis direction) of a stylus arm 24 caused by the circular motion in the XZ plane of the pivot-type stylus 12, that is, the circular motion in the XZ plane of the stylus arm 24.

A first feature of the present invention is that a measurement error due to a vertical movement error in the YZ plane (vertical movement error correction plane) of the stylus 12 performing circular motion in the XZ plane following the surface to be measured of the work 18 is corrected.

Therefore, in this embodiment, a corrector 26 is provided. The corrector 26 includes the pickup (calibration measurement device) 14, a correction parameter setting device 28, and a measurement data correcting device 30.

The pickup 14 performs a calibration measurement step. Specifically, the pickup 14 causes the stylus 12 to perform circular motion to obtain calibration measurement data including the displacement information of Y-axis direction (translation axis direction) value corresponding to the Z value of the stylus 12, as the calibration measurement step.

Also, the correction parameter setting device 28 consists of, for example, a computer 32, and performs a correction parameter setting step. Specifically, the correction parameter setting device 28 determines, as the correction parameter setting step, the value of the vertical movement error correction parameter best suited for correcting the measurement error due to the vertical movement error of the stylus 12 based on the displacement information of the stylus 12 included in the calibration measurement data.

The measurement data correcting device 30 consists of, for example, a computer 32, and performs a measurement data correcting step. Specifically, the measurement data correcting device 30 corrects, as the measurement data correcting step, the measurement data, which has been obtained by tracing the work to be measured by using the stylus 12, using the value of the vertical movement error correction parameter determined by the correction parameter setting device 28.

Next, the above-described configuration is explained in more detail. The pickup 14 causes, as the calibration measurement step, the stylus 12 to perform circular motion in the XZ plane by tracing the designated Y value on a reference sphere 18a in the X-axis direction using the stylus 12.

Also, the pickup 14 obtains, as the calibration measurement step, calibration measurement data by obtaining XZ cross-sectional contour information including at least the top of the sphere at a plurality of different Y values on the reference sphere 18a.

In this embodiment, as the reference sphere 18a, a complete sphere with its surface finished precisely and the radius R of which is known is used.

The correction parameter setting device 28 determines, as the correction parameter setting step, a vertical movement error correction parameter value by comparing the calibration measurement data with the reference information about the reference sphere 18a.

Therefore, in this embodiment, the correction parameter setting device 28 determines actual moving locus information actually drawn in the YZ plane by the stylus 12 based on the information of each top of the sphere included in the calibration measurement data. Also, the correction parameter setting device 28 determines ideal moving locus information in the YZ plane of the stylus 12 based on the reference contour information about the reference sphere 18a. The correction parameter setting device 28 estimates the displacement information of Y value corresponding to the Z value of the stylus 12 by comparing the actual moving locus information of the stylus 12 with the ideal moving locus information thereof. The correction parameter setting device 28 determines the value of the vertical movement error correction parameter best suited for correcting the estimated displacement information.

In this embodiment, the measuring instrument includes a feeding device 34 and an X-axis detector 36. The feeding device 34 feeds the supporting point 20 in the X-axis direction. The X-axis detector 36 outputs the amount of feed in the X-axis direction of the supporting point 20 performed by the feeding device 34.

In this embodiment, the measuring instrument includes a Y-axis table 38 and a Y-axis detector 40. The Y-axis table 38 is mounted with the work 18. The Y-axis table 38 is moved in the Y-axis direction in a state of being mounted with the work 18. The Y-axis detector 40 outputs the travel distance in the Y-axis direction of the Y-axis table 38.

In this embodiment, the XYZ coordinate values of a measurement point on the work 18 are estimated as described below. Specifically, in this embodiment, the XYZ coordinate values of the tip 16 are estimated based on a stylus arm length l, a stylus edge length h, and the amount of feed in the X-axis direction of the supporting point 20 by the feeding device 34. Based on the estimated XYZ coordinate values of the tip 16, the XYZ coordinate values of the point on the work 18 are estimated.

In this embodiment, the measuring instrument includes an analyzer 42. The analyzer 42 analyzes the necessary form etc. from the corrected data (the XYZ coordinate values of a point on the work) obtained by the measurement data correcting device 30.

In this embodiment, a Z range dividing step, described later, that is, a Z range divider 44 that divides the Z-axis direction measurement range is provided.

Figure 2A:
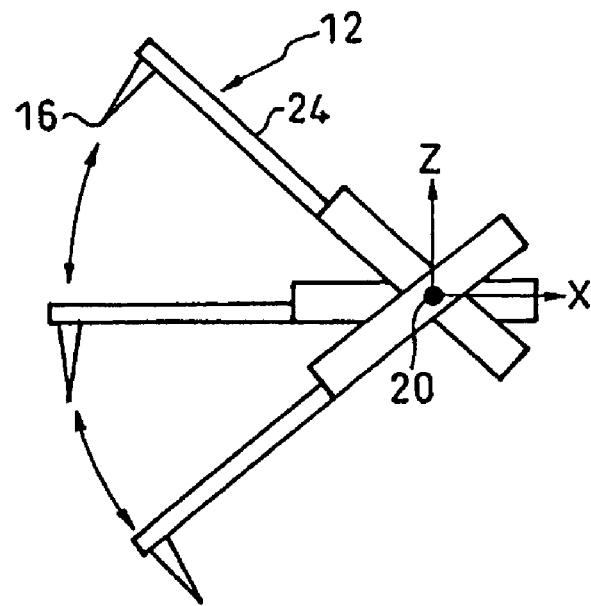
FIGS. 2A and 2B are an explanatory view of a vertical movement error of a stylus, which is to be corrected in a correction method in accordance with one embodiment.

The form measuring instrument 10 in accordance with this embodiment is configured as described above. The operation of the form measuring instrument 10 is explained below. The present invention has been made by paying attention to the following point: for the pickup 14 of the pivot-type stylus 12, correction must be made considering the circular motion of the stylus arm 24. In the correction considering the circular motion of the stylus arm 24, it is usually assumed only that the circular motion locus of the stylus arm 24 as shown in FIG. 2A exists in the XZ plane. Therefore, it is presumed that an influence due to a displacement from the XZ plane is not exerted.

Figure 2B:
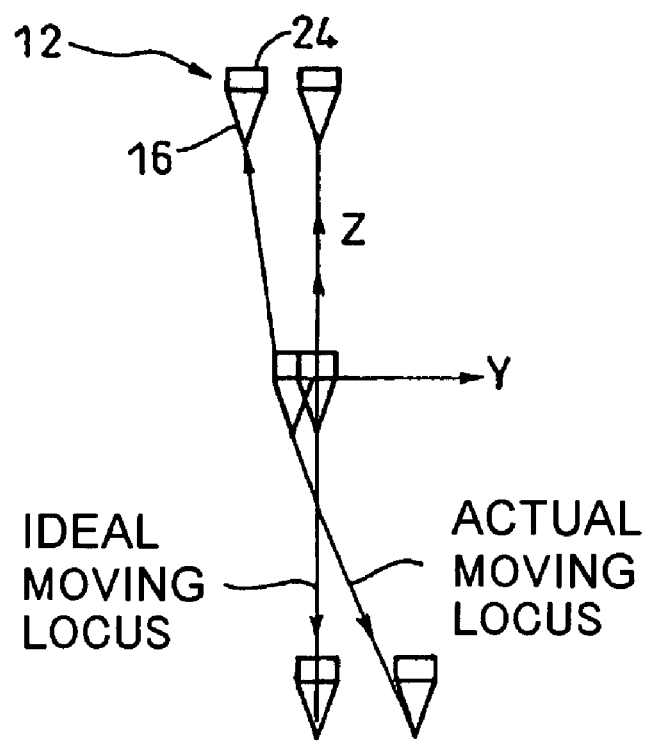

However, the inventors earnestly carried out studies on highly accurate correction processing of the data measured by the stylus 12, and found that, to be exact, the motion of the stylus arm 24 slightly displacements from the vertical movement in the YZ plane as shown in FIG. 2B. Therefore, it was confirmed that an error occurs on the Y coordinate value.

As shown in FIG. 2B, the ideal operation of the stylus 12 is parallel to the Z-axis direction in the YZ plane, whereas the actual operation of the stylus 12 has a displacement of Y value corresponding to the Z value in the YZ plane.

Therefore, the present invention provides a corrector for correcting the measurement error due to the vertical movement error in the YZ plane of the stylus. As the result, in the present invention, the correction processing of the data measured by the stylus can be performed with higher accuracy.

Next, the above-described operation is explained in more detail. In this embodiment, to perform correction processing with higher accuracy, the measurement error due to the vertical movement error of the stylus is corrected. For this purpose, in this embodiment, the calibration measurement step (S10) and the correction parameter setting step (S12) are provided as shown in FIG. 3.

<Calibration Measurement>

In the calibration measurement step (S10), the stylus 12 is moved, by which the calibration measurement data including the displacement information of Y value corresponding to the Z value of the stylus 12 can be obtained.

Therefore, in the calibration measurement step (S10), the stylus 12 is traced in the X-axis direction at the designated Y value on the reference sphere 18a, by which the stylus 12 is moved. Also, in the calibration measurement step (S10), the XZ cross-sectional contour information including at least the top of the reference sphere 18a is obtained at a plurality of different translation axis direction values on the reference sphere 18a, by which the calibration measurement data is obtained.

More specifically, the reference work 18a is moved in the Y-axis direction by the Y-axis table 38, and the stylus 12 is set at the designated Y value on the reference sphere 18a based on the designated value of the Y value detector. As shown in FIG. 3A, the stylus 12 is scanned in the X-axis direction at the designated Y value, by which the XZ cross-sectional contour information at the designated Y value is acquired.

Such acquisition of the XZ cross-sectional contour information at the designated Y value is made by changing the designated Y value by the movement in the Y-axis direction of the Y-axis table 38. At a plurality of designated Y values as shown in FIG. 3B, the XZ cross-sectional contour information is acquired.

In this embodiment, the calibration measurement is made by using the reference sphere 18a only in place of a general special-purpose unit, by which the calibration measurement can be performed at high speed, the cost can be reduced by the simplification of a calibration jig, and further the ease of use can be increased.

Also, in the measurement of a plurality of XZ cross sections, in order to increase the accuracy of calculation result of correction parameter, it is preferable that measurement such that the spaces between the measurement cross sections are as close as possible should be made as shown in FIG. 3B. However, in order to acquire the data efficiently, it is also preferable that measurement such that the spaces between the measurement cross sections are rougher than the spaces between the measurement cross sections shown in FIG. 3B should be made as shown in FIG. 3C.

<Correction Parameter Setting>

After the calibration measurement step (S10) has been finished, the correction parameter setting step (S12) is performed. In the correction parameter setting step (S12), based on the displacement information of the stylus 12 included in the calibration measurement data obtained in the calibration measurement step (S10), the value of the vertical movement error correction parameter best suited for correcting the measurement error due to the vertical movement error of the stylus 12 can be determined.

For this purpose, in the correction parameter setting step (S12), the value of the above-described vertical movement error correction parameter is determined by comparing the calibration measurement data with the reference information about the reference sphere 18a.

More specifically, in the correction parameter setting step (S12), the actual moving locus information actually drawn in the YZ plane by the stylus 12 is determined based on the information of the top of the sphere included in the calibration measurement data. Also, in the correction parameter setting step (S12), the ideal moving locus information in the YZ plane of the stylus 12 is determined based on the reference contour information about the reference sphere 18a.

In the correction parameter setting step (S12), the displacement information of Y value corresponding to the Z value of the stylus 12 is estimated by comparing the actual moving locus information of the stylus 12 with the ideal moving locus information thereof. Also, in the correction parameter setting step (S12), the value of the vertical movement error correction parameter best suited for correcting the estimated displacement information is determined.

Since the measurement error due to the vertical movement error of the stylus 12 can be estimated with high accuracy in this manner, the value of the vertical movement error correction parameter can be set more properly.

Using such a value of the vertical movement error correction parameter, the measurement data obtained by the measurement of a work 18b to be measured can be corrected.

<Measurement of Work>

Figure 4:
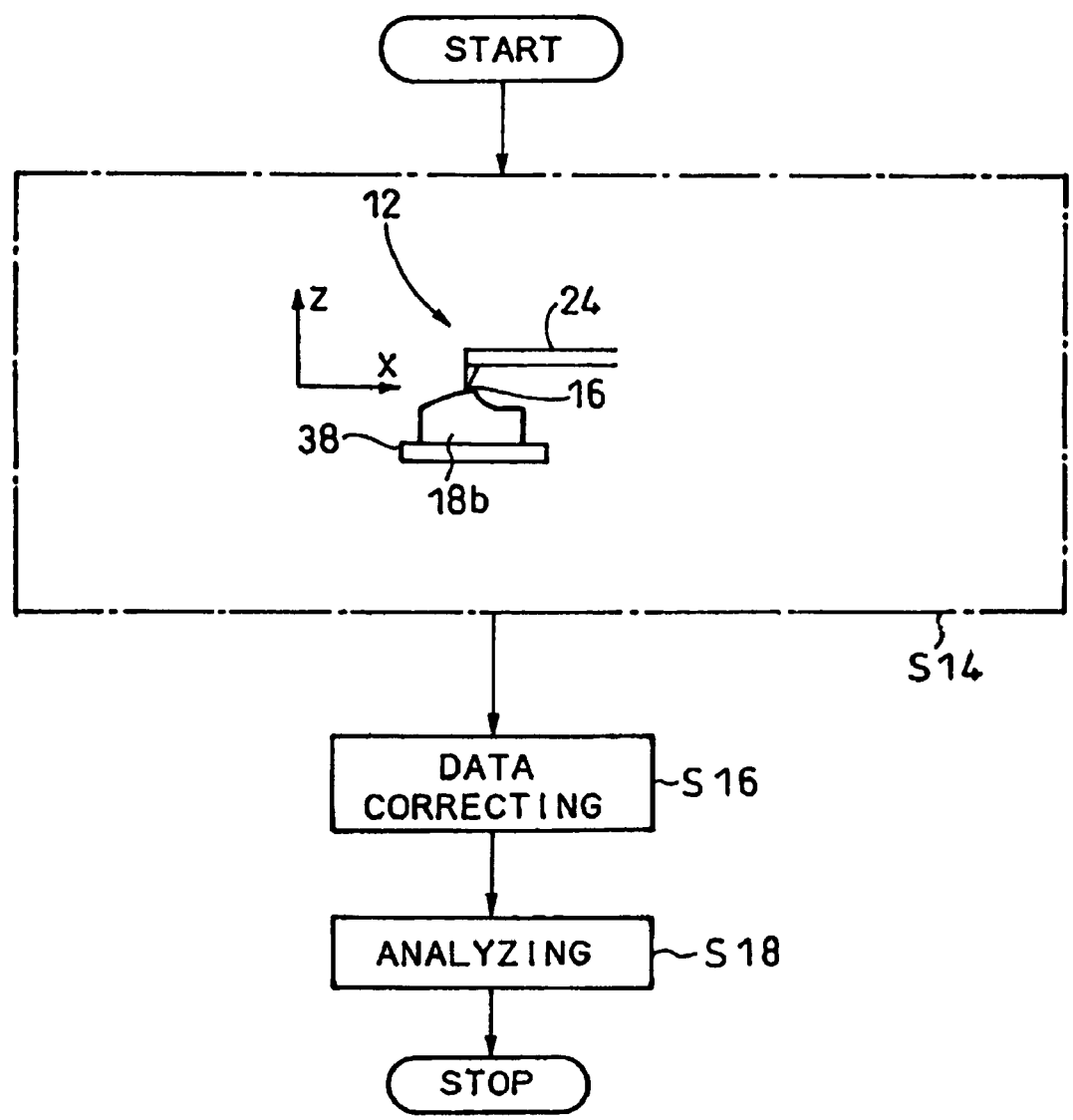
FIG. 4 is an explanatory view of a measurement data correcting step in accordance with one embodiment.

In a work measuring step (S14) as shown in FIG. 4, the measurement data is obtained by tracing the work 18b to be measured, in place of the reference work 18a, by the stylus 12.

<Correction of Measurement Data>

After the work measuring step (S14) has been finished, a measurement data correcting step (S16) is performed. In the measurement data correcting step (S16), the measurement data obtained in the work measuring step (S14) is corrected by using the correction parameter determined in the correction parameter setting step (S12).

As the result, in this embodiment, the measurement error due to the vertical movement error of the stylus 12, that is, the measurement error of Y value corresponding to the Z value in the YZ plane can be corrected from the measurement data with high accuracy.

As described above, in this embodiment, the calibration measurement step (calibration measurement device), the correction parameter setting step (correction parameter setting device), and the measurement data correcting step (measurement data correcting device) are provided.

As the result, in this embodiment, the vertical movement error of the stylus can be corrected with higher accuracy. Therefore, in this embodiment, correction processing of the data measured by the stylus can be performed with higher accuracy.

<Analysis of Shape etc.>

After the measurement data correcting step (S16) has been finished, an analyzing step (S18) is performed. In the analyzing step (S18), the contour etc. of work to be measured is analyzed by using the corrected data obtained in the measurement data correcting step (S16). Thereby, in this embodiment, the contour etc. can be analyzed with high accuracy as compared with the case where the general data is used.

Higher Accuracy

In this embodiment, in order to perform the correction processing of the data measured by the stylus 12 with higher accuracy, it is very important to make contrivance described below in the above-described configuration.

<Motion Error>

In this embodiment, in order to perform the correction processing of the data measured by the stylus 12 with higher accuracy, it is very important to simultaneously consider the measurement error due to the circular motion in the XZ plane of the stylus 12.

Figure 5:
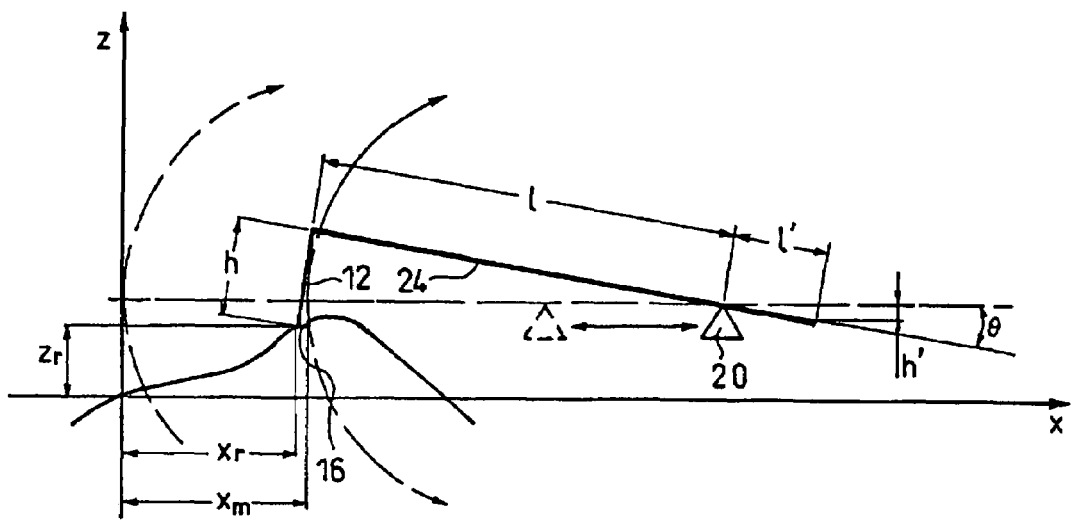
FIG. 5 is an explanatory view of a measurement error due to the circular motion in the XZ plane of a stylus, the measurement error being suitably corrected simultaneously with a vertical movement error, in a correction method in accordance with one embodiment.

Thereupon, in this embodiment, as the measurement error, a measurement error due to the circular motion of the pivot-type stylus 12 in the XZ plane (motion error correction plane) as shown in FIG. 5 is further considered. In the present invention, in the correction parameter setting step, a circular motion error correction parameter best suited for correcting the measurement error due to the circular motion of the pivot-type stylus in the XZ plane is further determined.

For this purpose, in this embodiment, in the correction parameter setting step (12), the XZ cross-sectional contour information at the designated Y value in the XY plane is further compared with the reference contour information about the reference sphere 18*a*, and the circular motion error correction parameter best suited for correcting the measurement error due to the circular motion in the XZ plane of the stylus 12 is estimated.

As the result, in this embodiment, the measurement error due to the circular motion in the XZ plane of the stylus 12 can be corrected together with the measurement error due to the vertical movement error of the stylus 12.

Therefore, in this embodiment, the correction processing of the data measured by the stylus 12 can be performed properly as compared with the case where attention is paid to only the measurement error due to the vertical movement error of the stylus 12 or the case where attention is paid to only the measurement error due to the circular motion of the stylus 12.

<Correction Algorithm>

Usually, it is thought that the general correction algorithm is used to correct the measurement error due to the vertical movement error of the stylus 12. That is to say, usually, it is thought that the same value of correction parameter is used in the whole region of the measurement range in the Z-axis direction.

On the other hand, in this embodiment, it is very preferable that a multilayer structure algorithm should be used to perform correction processing with higher accuracy.

Figures 6A, 6B:
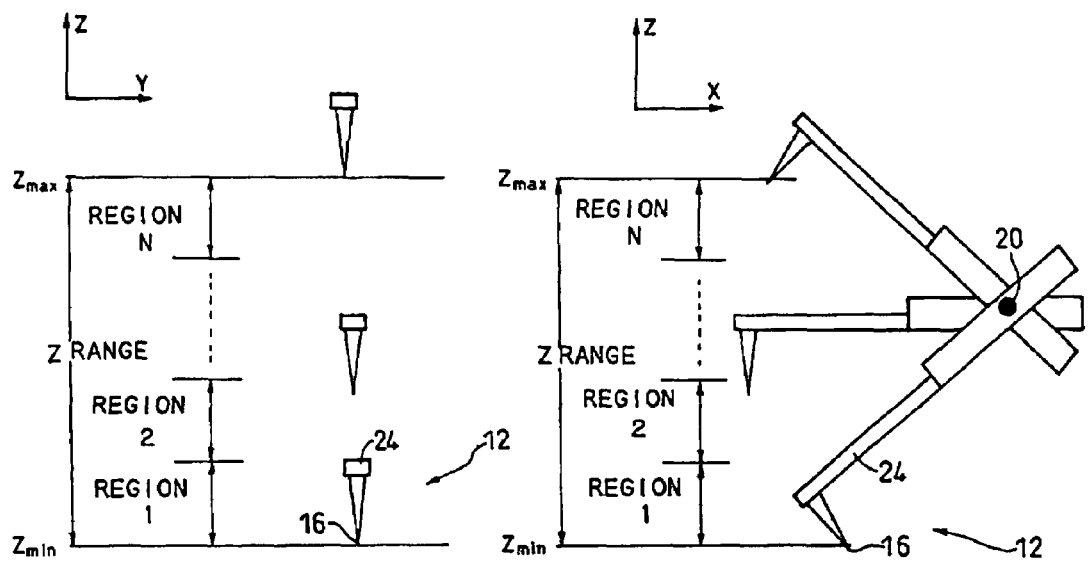
FIGS. 6A and 6B is an explanatory view of a multilayer structure algorithm suitable in a correction method in accordance with one embodiment.

Therefore, in this embodiment, as shown in FIG. 6A, the measurement range (Z range) in the Z-axis direction is divided in advance into a predetermined number of regions (region 1, region 2, . . . region N). In this embodiment, for each of the divided regions (region 1, region 2, . . . region N), the optimal value of the vertical movement error correction parameter is set.

As the result, in this embodiment, the value of the vertical movement error correction parameter can be determined properly as compared with the case where the general correction algorithm is used.

Also, usually, it is thought that the general correction algorithm is also used to correct the measurement error due to the circular motion in the XZ plane of the stylus 12. That is to say, usually, it is thought that the same value of correction parameter is used for the all regions of the measurement range in the Z-axis direction.

On the other hand, in this embodiment, it is very preferable that the multilayer structure algorithm should be used to perform correction processing with higher accuracy.

Therefore, in this embodiment, as shown in FIG. 6B, the measurement range (Z range) in the Z-axis direction is divided in advance into a predetermined number of regions (region 1, region 2, . . . region N). For each of the divided Z regions, the optimal value of circular motion error correction parameter is set.

As the result, in this embodiment, the value of circular motion error correction parameter can be determined properly as compared with the case where the general correction algorithm is used.

As described above, in this embodiment, the measurement range in the Z-axis direction is divided in advance into a predetermined number of regions. In the correction parameter setting step (S12), it is preferable to determine the optimal value of the vertical movement error correction parameter and the optimal value of the circular motion error correction parameter for each of the divided regions (region 1, region 2, . . . region N).

Also, in this embodiment, it is also possible to determine the value of the vertical movement error correction parameter and the value of circular motion error correction parameter separately. However, the simultaneous determination of all values of these parameters is very favorable in terms of efficient correction processing.

Therefore, in this embodiment, the Z range dividing step (S20) performed by using the Z range divider 44 is provided. In the Z range dividing step (S20), the division positions of Z range in FIG. 6A and the division positions of Z range in FIG. 6B are set so as to be the same.

In the correction parameter setting step (S12), the calibration measurement data obtained in the calibration measurement step (S10) is compared with the reference information about the reference sphere 18*a* by the nonlinear least-squares method. All optimal values of the vertical movement error correction parameter and the circular motion error correction parameter are calculated simultaneously for the divided regions (region 1, region 2, . . . region N).

Thereby, in this embodiment, all correction parameter values necessary for the correction of the various errors can be calculated simultaneously merely by making the calibration measurement of the reference sphere 18*a* once. Thereby, the efficiency of correction processing can be increased.

<Correction of Measurement Data>

In this embodiment, the measurement data is corrected as described below by using the correction parameter determined as described above.

In the measurement data correcting step (S16), a Z region to which the measurement data belongs is identified from the Z value of measurement data.

Thus, in the measurement data correcting step (S16), the value of the vertical movement error correction parameter and the value of circular motion error correction parameter that are best suited for correcting the measurement data in the identified Z region are selected from the values of the vertical movement error correction parameter and the values of circular motion error correction parameter that are determined in the correction parameter setting step (S12).

In the measurement data correcting step (S16), the measurement data is corrected by using the selected value of the vertical movement error correction parameter and the selected value of the circular motion error correction parameter.

Therefore, in this embodiment, the correction processing of data measured by the stylus 12 can be performed with high accuracy as compared with the conventional system, that is, as compared with the case where the same value of correction parameter is used for all regions of the Z axis.

<Correction of the Vertical Movement Error>

Next, the correction of the vertical movement error is explained in more detail. The measurement data obtained from the pickup 14 of the pivot-type stylus 12 can be corrected by a correction equation expressed as the following equation 1.

$$x_r = x_m + l\left(1 - \sqrt{1 - \left(\frac{gz_m}{l}\right)^2}\right) - h\frac{gz_m}{l}$$

$$z_r = gz_m + h\left(1 - \sqrt{1 - \left(\frac{gz_m}{l}\right)^2}\right)$$

(Equation 1)

Wherein l is a stylus arm length, h is a stylus edge length, and g is a gain coefficient.

In this embodiment, the vertical movement error of Y coordinate value obtained from the pickup 14 of the pivot-type stylus 12 can further be corrected. Specifically, when a Y coordinate value $Y_m$ of measurement data is given, the Y error depends on the Z coordinate value representing the fall position of the stylus 12. The Y error can be expressed by the following equation 2 as first-order approximation.

$$y_r = y_m + d \cdot z_m \quad \text{(Equation 2)}$$

Wherein d is a coefficient for the vertical movement error correction.

The correction equation expressed by the above equation 2 can be expressed by the following equation 3 as a high-order polynomial equation in a Z coordinate value $Z_m$ of the measurement data.

$$y_r = y_m + d_1 \cdot z_m + d_2 \cdot z_m^2 + d_3 \cdot z_m^3 + \ldots \quad \text{(Equation 3)}$$

In this embodiment, even if the correction equation is a primary equation, a satisfactory correction result can be obtained by using the multilayer structure algorithm.

<Multilayer Structure Algorithm>

Hereunder, the multilayer structure algorithm is explained in more detail. The basic concept of the multilayer structure algorithm is that as shown in FIG. 6, the Z range capable of being measured by the pivot-type stylus 12 is divided into the plurality of regions (region 1, region 2, ... region N), and the value of correction parameter best suited for each region is set.

For example, the stylus arm length l, the stylus edge length h, the gain coefficient g, and the coefficient d for the vertical movement correction are correction parameters. These correction parameters are set for each region.

Also, the center coordinates $(x_c, y_c, z_c)$ of reference sphere and a tip radius r are values of correction parameter that are common to the regions.

To estimate the correction parameter, calibration measurement is first made using the reference sphere.

The reference sphere is a work having a shape of a complete sphere with its surface finished precisely and the radius R of which is known. Also, the tip end shape of the pivot-type stylus 12 (the shape of the tip 25) is spherical.

The Z range is divided into N number of regions (region 1, region 2, ... region N). However, the Z range need not be divided equally.

Also, in order to correct the measurement error due to the circular motion of the stylus arm in the XZ plane, one cross section passing through the top of the reference sphere is merely measured. In this embodiment, to correct the vertical movement error of the stylus, the measurement of particular cross section passing through the top of the reference sphere is made in a plurality of cross sections.

Taking the calibration measurement data obtained by the measurement of the reference sphere as $(x_k^m, y_k^m, z_k^m)$, k=1, 2, ... n, the correction parameter is estimated so that the sum of squares of error with respect to the reference sphere is at a minimum.

For this purpose, taking the radius of reference sphere as R, the center coordinates of reference sphere as $(x_c, y_c, z_c)$, and the radius of the tip of the stylus as r, a correction parameter such that a performance index f expressed by the following equation 4 is made at a minimum is determined.

$$f = \sum_{k=1}^{n}\left\{\sqrt{\begin{array}{c}(x_k^r - x_c)^2 + \\ (y_k^r - y_c)^2 + \\ (z_k^r - z_c)^2\end{array}} - (R+r)\right\}^2$$

(Equation 4)

Wherein $(x_k^r, y_k^r, z_k^r)$ is a value obtained by correcting the measurement data $(x_k^m, y_k^m, z_k^m)$ by using the correction parameter. This correction value $(x_k^r, y_k^r, z_k^r)$ can be expressed by the following equation 5 by using the correction parameter.

$$x_k^r = x_k^m + l_i\left(1 - \sqrt{1 - \left(\frac{g_i z_k^m}{l_i}\right)^2}\right) - h_i\frac{g_i z_k^m}{l_i}$$

$$y_k^r = y_k^m + d_i z_k^m$$

$$z_k^r = g_i z_k^m + h_i\left(1 - \sqrt{1 - \left(\frac{g_i z_k^m}{l_i}\right)^2}\right)$$

(Equation 5)

However, it is assumed that the measurement data $(x_k^m, y_k^m, z_k^m)$ exists in region i after the Z range has been divided into N numbers. The symbols $l_i$, $h_i$, $g_i$, and $d_i$ are the stylus arm length, the stylus edge length, the gain coefficient, and the vertical movement error correction coefficient, respectively, in region i.

Herein, by utilizing the nonlinear least-squares method, the set of correction parameters $(l_i, h_i, g_i, d_i)$ i=1, 2, ... N that minimizes the performance index f expressed by the above equation 4, the center coordinates $(x_c, y_c, z_c)$ of reference sphere 18a, and the radius r of the tip 16 can be determined at the same time.

An optimal value is set to the stylus length l, the stylus edge length h, the gain coefficient g, and the vertical movement error correction coefficient d for each region.

Also, the center coordinates $(x_c, y_c, z_c)$ of the reference sphere 18a and the radius r of the tip 16 adopt a value of correction parameter common to the divided regions.

According to this embodiment, the vertical movement error in the YZ plane of the stylus 12 can be modeled more properly by using such a multilayer structure algorithm.

Moreover, according to this embodiment, by using the multilayer structure algorithm, not only the circular motion in the XZ plane of the pivot-type stylus 12 can be modeled properly, but also even if the circular motion of the pivot-type stylus 12 deviates from an ideal circle, the circular motion can be modeled more properly.

Therefore, according to this embodiment, a highly accurate correction result can be obtained as compared with the conventional system.

<Number of Divisions>

In this embodiment, in order to surely obtain high accuracy of correction processing using the multilayer structure algorithm, it is also very important to select the number of divisions N of the Z range.

In this embodiment, it is especially preferable that the number of divisions N of the Z range should be not smaller than 10 and not larger than 50.

If the number of divisions N of the Z range to the regions is smaller than 10, a satisfactory correction result is not obtained in some cases. In contrast, if the number of divisions N is larger than 50, the stability of calculation result is impaired in some cases.

<Least-Squares Method>

The nonlinear least-squares method, which is suited for being used in the estimation of the correction parameter, is explained.

In the present invention, when the correction parameter is estimated, by using the nonlinear least-squares method, all of the sets of correction parameters $(l_i, h_i, g_i, d_i)$ (i=1, 2, ... N) that minimize the performance index $\phi$, the center coordinates $(x_c, y_c, z_c)$ of the reference sphere 18a, and the radius r of the tip 16 can be determined at the same time.

For the gain coefficient and the radius at the tip of the pivot-type stylus, which have conventionally been calculated by using a step gage and a pin gauge, in the present invention, the calibration value can be obtained merely by measuring the reference sphere.

<Initial Value>

Next, the setting of an initial value, which is important in the nonlinear least-squares method, is explained.

In order to properly estimate the correction parameter by using the nonlinear least-squares method, the setting of the initial value of correction parameter is very important, and an optimal initial value of correction parameter must be given. If the initial value of correction parameter is badly given, the convergence takes much time, and in some cases, an entirely different solution is given.

For this reason, it is preferable that the nonlinear least-squares method should be carried out by using the initial value described below as the initial value of correction parameter.

In using the nonlinear least-squares method, first, an initial value must be given to an unknown parameter.

For the radius r of the tip of the stylus, the stylus arm length $l_i$ (i=1, 2, ... N), and the stylus edge length $h_i$ (i=1, 2, ... N), the designed value can be used as the initial value.

Also, it is preferable that for the gain coefficient $g_i$ (i=1, 2, ... N), the initial value should be 1, and for the vertical movement correction coefficient $d_i$ (i=1, 2, ... N), the initial value should be 0.

For the center coordinates $(x_c, y_c, z_c)$ of the reference sphere, the value obtained by circle fitting using the least-squares method, in which a performance index f expressed by the following equation 6 is made the performance index, is used as a proper initial value.

$$f = \sum_{k=1}^{n} \{(x_k^m - x_c)^2 + (y_k^m - y_c)^2 + (z_k^m - z_c)^2 - r_c^2\}^2 \quad \text{(Equation 6)}$$

Specifically, the initial value of center coordinates can be obtained by solving an equation expressed by the following equation 7.

$$\frac{\partial f}{\partial x_c} = -4\sum_{k=1}^{n} \left\{ \begin{array}{l} (x_k^m - x_c)^2 + \\ (y_k^m - y_c)^2 + \\ (z_k^m - z_c)^2 - r_c^2 \end{array} \right\} (x_k^m - x_c) = 0 \quad \text{(Equation 7)}$$

$$\frac{\partial f}{\partial y_c} = -4\sum_{k=1}^{n} \left\{ \begin{array}{l} (x_k^m - x_c)^2 + \\ (y_k^m - y_c)^2 + \\ (z_k^m - z_c)^2 - r_c^2 \end{array} \right\} (y_k^m - y_c) = 0$$

$$\frac{\partial f}{\partial z_c} = -4\sum_{k=1}^{n} \left\{ \begin{array}{l} (x_k^m - x_c)^2 + \\ (y_k^m - y_c)^2 + \\ (z_k^m - z_c)^2 - r_c^2 \end{array} \right\} (z_k^m - z_c) = 0$$

$$\frac{\partial f}{\partial r_c} = -4\sum_{k=1}^{n} \left\{ \begin{array}{l} (x_k^m - x_c)^2 + \\ (y_k^m - y_c)^2 + \\ (z_k^m - z_c)^2 - r_c^2 \end{array} \right\} r_c = 0$$

Herein, the square $r_c^2$ of the sum $r_c$ of the radius of reference sphere and the radius of the tip of the stylus can be expressed by the following equation 8.

$$r_c^2 = \frac{1}{n}\sum_{k=1}^{n} \left\{ \begin{array}{l} (x_k^m - x_c)^2 + \\ (y_k^m - y_c)^2 + \\ (z_k^m - z_c)^2 \end{array} \right\} \quad \text{(Equation 8)}$$

Therefore, the equation to be solved is expressed by the following equation 9.

$$2\left(\sum_{k=1}^{n} x_k^{m2} - n\bar{x}^2\right)x_c + 2\left(\sum_{k=1}^{n} x_k^m y_k^m - n\bar{x}\bar{y}\right)y_c + \quad \text{(Equation 9)}$$

$$2\left(\sum_{k=1}^{n} x_k^m z_k^m - n\bar{x}\bar{y}\right)z_c = \sum_{k=1}^{n} (x_k^{m2} + y_k^{m2} + z_k^{m2})(x_k^m - \bar{x})$$

$$2\left(\sum_{k=1}^{n} x_k^{m2} y_k^m - n\bar{x}\bar{y}\right)x_c + 2\left(\sum_{k=1}^{n} y_k^{m2} - n\bar{y}^2\right)y_c +$$

$$2\left(\sum_{k=1}^{n} y_k^m z_k^m - n\bar{y}\bar{z}\right)z_c = \sum_{k=1}^{n} (x_k^{m2} + y_k^{m2} + z_k^{m2})(y_k^m - \bar{y})$$

$$2\left(\sum_{k=1}^{n} x_k^m z_k^m - n\bar{x}\bar{z}\right)x_c + 2\left(\sum_{k=1}^{n} y_k^m z_k^m - n\bar{y}\bar{z}\right)y_c +$$

$$2\left(\sum_{k=1}^{n} z_k^{m2} - n\bar{z}^2\right)z_c = \sum_{k=1}^{n} (x_k^{m2} + y_k^{m2} + z_k^{m2})(z_k^m - \bar{z})$$

However, the relationship expressed by the following equation 10 holds.

$$\bar{x} = \frac{1}{n}\sum_{k=1}^{n} x_k^m \quad \text{(Equation 10)}$$

-continued $$\bar{y} = \frac{1}{n}\sum_{k=1}^{n} y_k^m$$

$$\bar{z} = \frac{1}{n}\sum_{k=1}^{n} z_k^m$$

<Method for Estimation>

Also, to efficiently estimate the parameter by using the nonlinear least-squares method, the Levenberg-Marqurdt method described below can be used.

In the case where the Levenberg-Marqurdt method is used in the calculation of the nonlinear least-squares method, the update amount vector ΔX of unknown parameter can be determined by solving the following equation 11 taking the performance index as $\phi = f^T f$, the Jacobian matrix as J, and the damping factor as μ.

$$(J^T J + \mu I)\Delta X = -J^T f \quad \text{(Equation 11)}$$

Wherein I is a unit matrix. The update of unknown parameter has only to finish at the time point when the convergence condition that the update amount vector ΔX is sufficiently small or the change in performance index is sufficiently small is met.

Specifically, as the following equation 12, the elements of the Jacobian matrix can be determined by the following equation 13.

$$f_k = \sqrt{(x_k^r - x_c)^2 + (y_k^r - y_c)^2 + (z_k^r - z_c)^2} - (R + r) \quad \text{(Equation 12)}$$

$$k = 1, 2, \ldots, n$$

$$\frac{\partial f_k}{\partial g_i} = p_x \frac{\partial x_k^r}{\partial g_i} + p_z \frac{\partial z_k^r}{\partial g_i} \quad \text{(Equation 13)}$$

$$\frac{\partial f_k}{\partial l_i} = p_x \frac{\partial x_k^r}{\partial l_i} + p_z \frac{\partial z_k^r}{\partial l_i}$$

$$\frac{\partial f_k}{\partial h_i} = p_x \frac{\partial x_k^r}{\partial h_i} + p_z \frac{\partial z_k^r}{\partial h_i}$$

$$\frac{\partial f_k}{\partial d_i} = p_y \frac{\partial y_k^r}{\partial d_i}$$

$$\frac{\partial f_k}{\partial r} = -1$$

$$\frac{\partial f_k}{\partial x_c} = -p_x$$

$$\frac{\partial f_k}{\partial y_c} = -p_y$$

$$\frac{\partial f_k}{\partial z_c} = -p_z$$

However, in the following equation 13, $P_x$, $P_y$, and $P_z$ satisfy the relationship given in the following equation 14.

$$p_x = \frac{(x_k^r - x_c)}{\sqrt{(x_k^r - x_c)^2 + (y_k^r - y_c)^2 + (z_k^r - z_c)^2}} \quad \text{(Equation 14)}$$

$$p_y = \frac{(y_k^r - y_c)}{\sqrt{(x_k^r - x_c)^2 + (y_k^r - y_c)^2 + (z_k^r - z_c)^2}}$$

$$p_z = \frac{(z_k^r - z_c)}{\sqrt{(x_k^r - x_c)^2 + (y_k^r - y_c)^2 + (z_k^r - z_c)^2}}$$

Using the update amount vector $\Delta X^{(m)}$ obtained in the m-th iteration step, the unknown parameter can be determined by successive updating until the convergence condition is met by the following equation 15.

$$X^{(m)} = X^{(m-1)} + \Delta X^{(m)} \quad \text{(Equation 15)}$$

Wherein $X^{(0)}$ is the initial value of unknown parameter.

As described above, in this embodiment, the nonlinear least-squares method is used in estimating the correction parameter. Thereby, all of the correction parameters can be calculated merely by making calibration measurement once. Thereby, the optimal correction parameter can be acquired efficiently.

MODIFICATION EXAMPLE

<Unknown Parameter>

In the above-described embodiment, the case where calibration is made by the reference sphere whose radius R is known has been explained. However, the present invention is not limited to this case.

For example, even in the case where the radius R of reference sphere is not valued exactly, if the radius r of the tip of the stylus is known (the calibration value obtained by the measurement using the pin gauge can also be used), in place of the radius r of the tip of the stylus, the radius R of reference sphere is considered as an unknown parameter, by which a theoretical development that is the same as the theoretical development in the above-described embodiment can be achieved.

<Linear Stylus>

Also, in the above-described embodiment, the example in which the pivot-type stylus is used as a stylus has been explained. However, the present invention is not limited to this type of the stylus.

For example, it is also preferable that the present invention should be applied to a linear stylus. The linear stylus is a stylus that performs linear motion following the height of the work.

It is also very preferable that the present invention should be applied to the measurement error due to the vertical movement error in the YZ plane of the linear stylus or the measurement error due to the straightness of the linear motion in the XZ plane of the linear stylus.

What is claimed is:

1. A correction method for correcting a measurement error included in data obtained by tracing the surface to be measured of a work in a measurement axis direction by using a tip of a stylus, the measurement error being a measurement error due to a vertical movement error of the stylus displaced following the surface to be measured of the work, and the vertical movement error being a displacement in a translation axis direction value according to a height detection axis direction value of the tip position in a vertical movement error correction plane specified by the height detection axis and a translation axis, the translation axis being perpendicular to the height detection axis, wherein the correction method comprises:

a calibration measurement step of obtaining calibration measurement data including the displacement information of the translation axis direction value corresponding to the height detection axis direction value of the stylus by moving the stylus; and a correction parameter setting step of determining a vertical movement error correction parameter value best suited for correcting the measurement error due to the vertical movement error of the stylus based on the displacement information of the stylus included in the calibration measurement data obtained in the calibration measurement step; and wherein a measurement range in the height detection axis direction is divided in advance into a predetermined number of regions, and wherein in the correction parameter setting step, the optimal value of the vertical movement error correction parameter is determined in each of the divided regions.

2. The correction method according to claim 1, wherein in the calibration measurement step, a reference sphere that is a complete sphere with its surface finished precisely is traced in the measurement axis direction at a designated translation axis direction value by the stylus, whereby the stylus is moved, and also, cross-sectional contour information including at least the top of the sphere is obtained in a plurality of different translation axis direction values on the reference sphere, whereby the calibration measurement data is obtained; and in the correction parameter setting step, the value of the vertical movement error correction parameter is determined by comparing the calibration measurement data with reference information about the reference sphere.

3. The correction method according to claim 2, wherein in the correction parameter setting step, actual moving locus information actually drawn on the vertical movement error correction plane by the stylus based on the information of the top of the sphere included in the calibration measurement data is determined, and also, ideal moving locus information on the vertical movement error correction plane of the stylus is determined based on the reference contour information about the reference sphere; and in the correction parameter setting step, by comparing the actual moving locus information of the stylus with the ideal moving locus information thereof, the displacement information of the translation axis direction value corresponding to the height detection axis direction value of the stylus is estimated, and the value of the vertical movement error correction parameter best suited for correcting the estimated displacement information is determined.

4. The correction method according to claim 1, wherein the measurement error is a measurement error due to the vertical movement error of the pivot-type stylus performing circular motion on a motion error correction plane specified by the measurement axis and the height detection axis.

5. The correction method according to claim 1, wherein the measurement error is the vertical movement error of a linear stylus performing linear motion on the motion error correction plane specified by the measurement axis and the height detection axis.

6. The correction method according to claim 1, wherein the measurement error is a measurement error due to the motion of the stylus in the motion error correction plane specified by the measurement axis and the height detection axis, and in the correction parameter setting step, the value of a motion error correction parameter best suited for correcting the measurement error due to the motion of the stylus in the motion error correction plane is further determined.

7. The correction method according to claim 1, wherein in the correction parameter setting step, the optimal value of the vertical movement error correction parameter is determined in each of the divided regions at the same time by using the nonlinear least-squares method.

8. The correction method according to claim 1, wherein the correction method comprises a measurement data correcting step of correcting a measurement data, which is obtained by tracing the work to be measured by using the stylus, by using the value of the vertical movement error correction parameter, and in the measurement data correcting step, the value of the vertical movement error correction parameter best suited for correcting the measurement data is selected from the values of the vertical movement error correction parameter, which is determined in the correction parameter setting step, based on the height detection axis direction value that the measurement data has.

9. The correction method according to claim 6, wherein in the correction parameter setting step, the optimal value of the motion error correction parameter is determined in each of the divided regions at the same time by using the nonlinear least-squares method.

10. The correction method according to claim 6, wherein the correction method comprises a measurement data correcting step of correcting a measurement data, which is obtained by tracing the work to be measured by using the stylus, by using the value of the motion error correction parameter, and in the measurement data correcting step, the value of the motion error correction parameter best suited for correcting the measurement data is selected from the values of the motion error correction parameter, which are determined in the correction parameter setting step, based on the height detection axis direction value that the measurement data has.

11. A measuring instrument comprising a stylus displaced following the surface to be measured of a work; and a pickup for outputting at least a height detection axis direction value of the stylus, wherein the measuring instrument further comprises a corrector for correcting a measurement error included in the data obtained by tracing the surface to be measured of the work in a measurement axis direction by a tip of the stylus, the measurement error being a measurement error due to a vertical movement error of the stylus, and the vertical movement error being a displacement in a translation axis direction corresponding to the height detection axis direction value of the tip position in a vertical movement error correction plane specified by the height detection axis and a translation axis, the translation axis being perpendicular to the height detection axis;

the corrector comprising a calibration measuring device that obtains the calibration measurement data including the displacement information of a translation axis direction value corresponding to the height detection axis direction value of the stylus by moving the stylus;

a correction parameter setting device that determines the value of the vertical movement error correction parameter best suited for correcting the measurement error due to the vertical movement error of the stylus based on the displacement information of the stylus included in the calibration measurement data obtained by the calibration measuring device; and a measurement data correcting device that corrects a measurement data, which is obtained by tracing the work to be measured by using the stylus, by using the value of the vertical movement error correction parameter determined by the correction parameter setting device; and wherein a measurement range in the height detection axis direction is divided in advance into a predetermined number of regions, and in the correction parameter setting step, the optimal value of the vertical movement error correction parameter is determined in each of the divided regions.

* * * * *